July 4, 1950 — L. G. BOWEN — 2,513,272
DISPENSING VALVE FOR MATERIAL UNDER PRESSURE
Filed Jan. 26, 1949 — 2 Sheets-Sheet 1
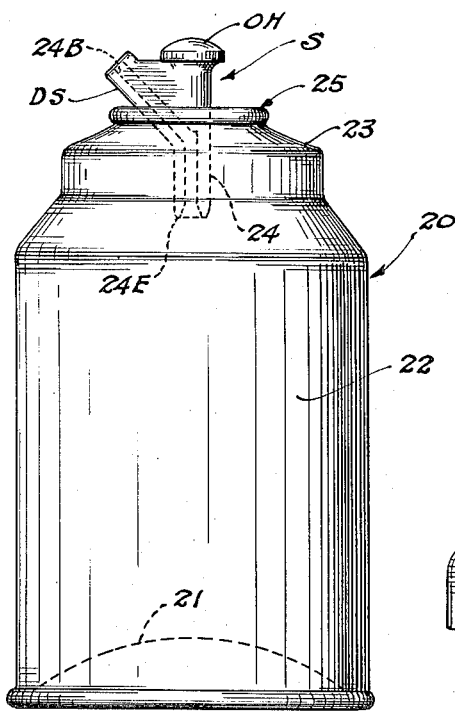
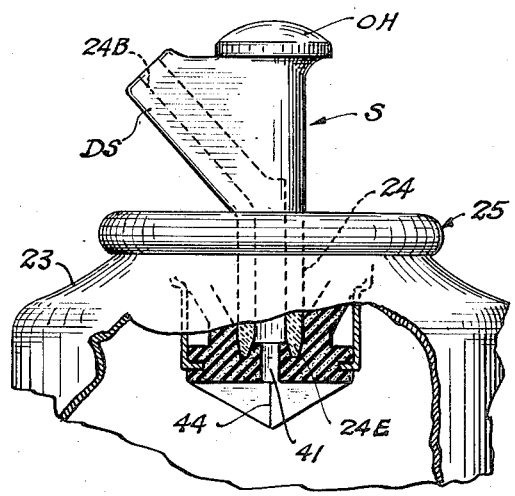
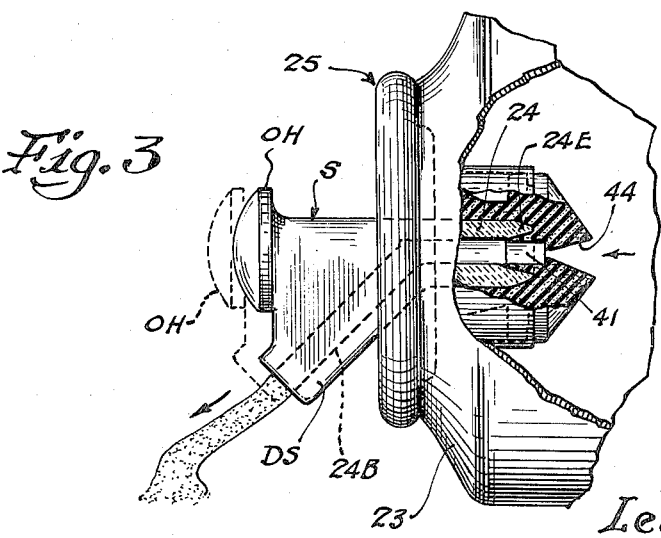
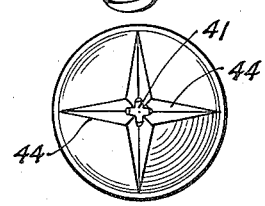
Inventor
Leslie G. Bowen
By Ferd Bing
Attorney July 4, 1950 L. G. BOWEN 2,513,272
DISPENSING VALVE FOR MATERIAL UNDER PRESSURE
Filed Jan. 26, 1949 2 Sheets-Sheet 2

Inventor.
Leslie G. Bowen
By Ferd Bing
Attorney

Patented July 4, 1950

2,513,272

UNITED STATES PATENT OFFICE 2,513,272

DISPENSING VALVE FOR MATERIAL UNDER PRESSURE

Leslie G. Bowen, Evanston, Ill., assignor, by direct and mesne assignments, to Dispenso Valve Corporation, Chicago, Ill., a corporation of Illinois Application January 26, 1949, Serial No. 72,933

12 Claims. (Cl. 222—490)

This invention relates to dispensing containers and particularly to such containers wherein substance to be dispensed from the container is placed under relatively high pressure in the container and the discharge or dispensing of the substance is governed by a manually releasable check valve.

It has recently been found possible to dispense foods such as cream from a container by placing this food, such as cream, under pressure in the container and affording a normally closed, manually opened check valve whereby the dispensing of the food substance may readily be controlled, and when this mode of dispensing is applied to cream, a suitable gas under pressure may be employed which breaks up the fatty components of the cream so that the cream is dispensed in the form of whipped cream. While this mode of sale of cream to be dispensed as whipped cream has been found to be practical insofar as the production of whipped cream may be concerned, the various containers and dispensing valves that have heretofore been used have been found to be objectionable in various respects.

Thus, it has been found that the valve mechanism, in order to render this mode of distribution practical, must be relatively simple and inexpensive insofar as manufacturing operations may be concerned, and where these requirements have been met, it has been found that the valve structures have had highly objectionable operational characteristics. For example, one form of valve that has been commercially used for this purpose has been found to be of such a character that the valve is frequently moved inadvertently to its open position, thereby to cause undesired discharge of the cream in its whipped condition from the container, and in addition to this objectional aspect of the prior valve, it has been found that there is a tendency for cream to collect in a relatively exposed location between the actual valve structure and the end of the discharge opening or passage, and this, of course, is highly objectionable from the standpoint of health or sanitation.

In view of the foregoing, it is an important object of the present invention to enable a check valve for use on such dispensing containers to be economically produced and to enable this to be done in such a way that the foregoing objections will be avoided. More specifically, it is an object of the present invention to enable such a dispensing valve to be associated with a separate operating and discharging spout so that this spout may be removed when the container is not being used. Moreover, it is a related object of the present invention to enable such a removable spout to cooperate with the valve structure in such a way that when the operating spout is removed, all of the cream or other food substance that has actually passed the valve opening will be left in a clean and sanitary condition.

Other and related objects of the present invention are to enable such a valve structure to be readily and easily manufactured by variations of well known manufacturing processes, to enable such a valve structure to be incorporated in a dispensing container in such a way that the containers may readily be handled, packed and distributed without danger of inadvertent operation of the valve, and to afford such a valve structure in which the operating member may be retained by the user for use on any such dispensing containers that may be purchased in the future.

Other and further objects of the present invention will be apparent from the following description and claims and are illustrated in the accompanying drawings, which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a side elevational view of a dispensing container embodying the valve structure of the present invention, the operating spout member being shown in its position of use;

Fig. 2 is an enlarged view of a portion of Fig. 1 and taken partially in vertical section to illustrate details of internal construction;

Fig. 3 is a view showing the upper portion of the container in a horizontal dispensing position, and with the valve member in its open relationship;

Fig. 4 is a bottom view of the valve member in its open position;

Figure 5:
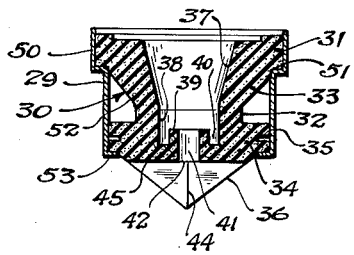
Fig. 5 is a vertical sectional view showing the first step in the assembly operation.

For purposes of disclosure, the invention is herein illustrated as embodied in a dispensing container 20 of the kind that is adapted particularly for use in dispensing cream which is placed under gaseous pressure in the container so that the discharged product takes the form of whipped cream. The container 20 takes the form of a generally cylindrical metal can having a domed bottom wall 21 and a generally cylindrical side wall 22 which is reduced at its upper end to afford a relatively small neck portion 23 with which a check valve structure 25 embodying the features of the invention may be associated. It should be pointed out that the container 20 with its reduced neck portion 23 is a commonly available commercial product, and the valve structure 25 of the present invention has been particularly adapted for association with this commercially available container. The neck portion 23 has a rolled upper end portion affording an annular bead 26 with which the valve structure 25 is associated in a manner that will hereinafter be described in detail. The valve structure 25 includes a detachably related operating element or spout S which may advantageously be formed from a plastic material to afford a stem 24 that is generally of round form so that the lower end may be inserted into the valve structure 25. The outer end of the spout has an operating head OH, and below the operating head OH and spaced upwardly from the lower end of the stem 24, a laterally projecting, angularly related discharge spout DS is afforded. A discharge bore 24B extends upwardly from the lower end of the stem 24 and branches laterally and angularly through the discharge spout DS, thereby to afford a discharge passage from the tapered annular lower end 24E of the stem 24 through the discharge spout DS at one side of and in spaced relation to the operating head OH.

The valve structure 25 is shown in detail in Figs. 2 to 10 of the drawings, and in certain of these views, a sequence of assembly operations has been illustrated so that the advantageous characteristics of the valve structure 25 may be more readily apparent.

Figure 7:
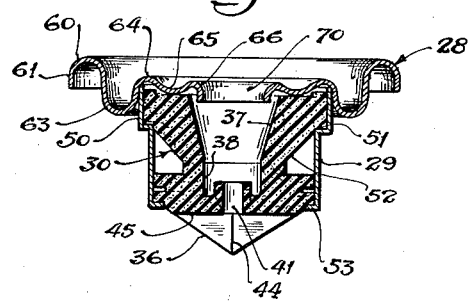
Fig. 7 is a view showing the second step in the assembly operation.
Figure 6:
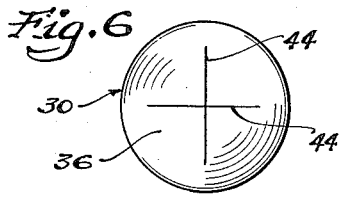
Fig. 6 is a bottom view of the valve in its closed position.
Figure 11:
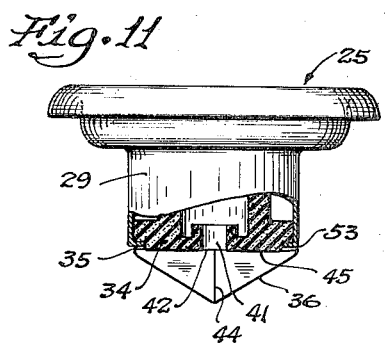
Fig. 11 is a view showing the final step in the assembly of the valve member.

In Fig. 11 of the drawings, the valve structure 25 is illustrated in its finally assembled form, and just prior to the time when the valve assembly is to be finally associated with the attaching bead 26 of the container 20, and this valve structure 25 is formed from three individual elements that are shown in partially assembled and partially formed relationship in Fig. 7 of the drawings. Thus, the valve structure 25 includes an outer connecting or attaching cap or plate 28, a supporting sleeve 29, and a rubber valve member 30 that is mounted primarily within the sleeve 29. As will hereinafter be described in detail, the upper end of the sleeve 29 is anchored in the mounting plate 28 by a series of forming operations which serve to anchor the upper end of the rubber valve member 20, which is generally sleeve-like in its configuration, and a lower end portion of the generally sleeve-like rubber valve member 30 is anchored on the lower end of the mounting sleeve 29 so that the sleeve-like rubber valve member 30 is placed under a normal longitudinal tension which tends to close the valve member in a manner that will be described presently.

The rubber valve member 30 is generally sleeve-like in form as hereinbefore pointed out, and has a flange 31 of annular form extended outwardly at its upper edge. The rubber valve member 30 extends downwardly from the flange 31 in a generally sleeve-like or generally cylindrical form to a lower wall portion 32 that is relatively thin and of a reduced diameter, and between the flange 31 and the wall portion 32, the outer surface of the valve member tapers inwardly and downwardly. At the lower end of the thin wall section 32, the valve member has an outwardly projecting flange 34 that is relatively thick in what may be termed a vertical direction, and in this flange 34 an annular groove 35 is formed. Beneath the flange 34, the rubber valve member 30 is tapered inwardly and downwardly as at 36 to form a pointed lower end for purposes that will hereinafter become apparent.

The rubber valve member 30 has its inner surface formed so as to be inwardly and downwardly tapered as at 37 to a point disposed substantially at the upper level of the thin wall section 32, and the tapered opening or surface 37 then merges with a cylindrical portion that extends downwardly to a point located substantially at or slightly below the plane of the annular groove 35. Spaced inwardly from the cylindrical surface 38, an upwardly extending cylindrical boss 39 is formed so as to extend upwardly for a short distance from the lowermost point of the cylindrical surface 38, and this serves to define an annular seat 40 between the surface 38 and the outer surface of the boss 39 to receive the lower end 24E of the operating member or spout S. Centrally of the boss 39, a downwardly extending bore or opening 41 is formed which terminates in a flat bottom surface 42 somewhat below the lower edge of the flange 34. The passage 41 constitutes the passage through which the liquid or food is to move in an upward or outward direction, Fig. 5, in the use of the dispensing container, and in order that the lower end of the bore or passage 41 may be opened at will by the operating spout S, a plurality of transverse or diametric slits 44 are formed so as to extend upwardly in the pointed lower end of the rubber valve, these slits terminating at 45 in substantially the plane of the bottom wall 42 of the passage 41. Thus, by bending the lower portions of the valve member so as to separate the slits 44, as shown in Figs. 3 and 4 of the drawings, the valve 30 may be opened, and as will hereinafter be described in greater detail, the natural resiliency of and the tension that is applied to the rubber valve may tend to return the elements of the pointed end 36 of the rubber valve member to the closed position of Figs. 5 and 6, and when this occurs, the pressure within the container tends to maintain the valve in closed position. The requisite valve opening movement is imparted to the lower portion of the valve member 30 by means of the manually operable discharge spout S that is removably associated with the valve structure 25 as illustrated in Figs. 1 to 3 of the drawings.

The sleeve 29 is generally cylindrical in form, and at its upper end has a relatively large and cylindrical portion 50 within which the flange 31 of the rubber valve member 30 may be received as shown in Fig. 5 of the drawings. When the flange 31 is thus located within the portion 50 of the sleeve 29, its lower edge is arranged to rest upon a shoulder 51 that is formed so as to extend inwardly, and this forming of the sleeve 29 affords a reduced lower portion 52 that terminates in an inwardly extended bottom flange 53. This bottom flange 53 is utilized in the valve structure 25 as it is finally assembled to cooperate with other elements of the structure in imparting a normal longitudinal tension to the rubber valve member 30, as will hereinafter be described, and in doing this, the flange 53 is associated with the rubber valve member so as to extend into the annular slot 35 in the flange 34. However, in the initial assembly operations, the rubber valve member 30 is positioned as shown in Fig. 5 within the sleeve 29 so that the flange 34 bears against the upper or inner face of the flange 53, while the flange 31 bears against the shoulder 51. After the rubber valve member has thus been located within the sleeve 29, this partial assembly is associated with the cap 28 in such a way as to anchor the upper flange 31 securely in respect not only to the upper end of the sleeve 29, but also with respect to the cap 28, the sleeve 29 being at the same time effectually interlocked with the cap 28 so as to be anchored thereto.

Figure 12:
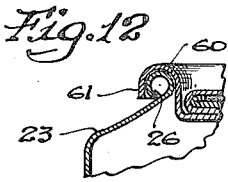
Fig. 12 is a view showing in a fragmentary way, the location of the valve assembly on the top of the container.
Figure 13:
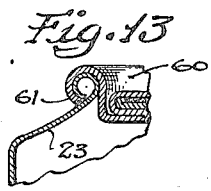
Fig. 13 is a view similar to Fig. 12 and showing the way in which the valve assembly is seamed onto the top or neck of the container.

Thus the cap 28 is formed initially as a sheet metal stamping of the form shown in Fig. 7, and it will be observed that this cap 28 constitutes a series of annular corrugations, the outer one of which comprises a downwardly facing corrugation 60 that terminates in a downwardly extending outer edge flange 61. This outer corrugation 60 is afforded so that the valve structure 29 may be readily associated with the attaching bead 26 of the container 20 in a conventional manner, as will be evident from a consideration of Figs. 12 and 13 of the drawings, and this corrugation may thus be termed an annular attaching area of the plate or cap 28. Thus, this corrugation 60 may be seated on and in embracing relationship with respect to the bead 26, and the flange 61 and the opposite wall of the corrugation 60 are forced toward each other so as to assume the form shown in Fig. 13, wherein the corrugation 60 is interlocked with the bead 26 against upward displacement. This operation is, of course, performed only after complete assembly of the valve structure 25.

Inwardly of the downwardly opening corrugation 60 in a radial sense, the cap 28 is formed so as to extend downwardly to afford an upwardly opening corrugation 63, and is then extended upwardly to afford a downwardly opening corrugation 64 that is of a slightly smaller diameter at its mid-point than the diameter of the portion 50 of the sleeve 29. Radially inwardly of the corrugation 60, the cap 28 is formed to afford an upwardly opening annular corrugation 65 which merges with a downwardly opening corrugation 66, the inner flange of which defines a central opening 70 through which the stem 24 of the spout S may be inserted into cooperative relationship with the annular seat 40 of the valve member.

Figure 8:
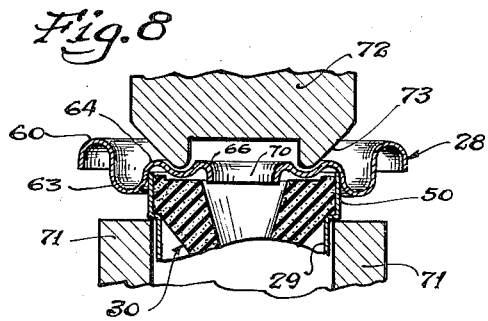
Fig. 8 is a view showing a forming tool in position for forming the cap element of the valve assembly from the form shown in Fig. 9.
Figure 9:
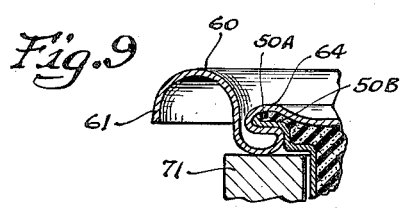
Fig. 9 is a fragmentary view illustrating the intermediate form of the elements after the operation of the forming tool shown in Fig. 8.
Figure 10:
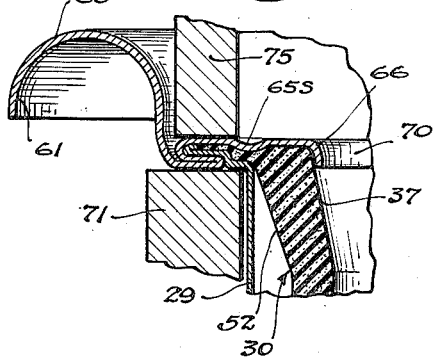
Fig. 10 is a view showing the final forming operation.

The cap 28 as it is thus afforded is put in position on the upper end of the sleeve 29 as indicated in Fig. 7, and when this is done, the upper end edge of the portion 50 of the sleeve 29 engages the upwardly and inwardly sloping surface of the downwardly facing corrugation 64, and this results in an advantageous forming and interlocking action, as will hereinafter appear. The assembly that is thus afforded is then put in position on an annular supporting anvil 71 as shown in Fig. 8 of the drawings, and this annular supporting anvil engages the lower face of the shoulder 51 of the sleeve 29. The elements are then forced toward each other by an upper forming tool 72, as shown in Fig. 8, this forming tool having a sloping forming surface 73 that is substantially aligned with the corrugation 65, but which is so formed that it strikes the surface of the corrugation 64 so as to force the same in an outward direction toward the form shown in Fig. 9. As this operation progresses, however, the cap 28 is first moved in a downward direction so that the upper portion of the wall 50 is formed or rolled radially inwardly as at 50A, Fig. 9, and as the downward movement progresses, the corrugation 64 is forced in a radially outward direction so that portions of the flange 31 of the valve member 30 are clamped between the corrugation 64 and the portion 50 of the sleeve 29. In this connection, it will be noted that a part of the wall portion 50 is bent outwardly as at 50B, Fig. 9, as the corrugation 64 moves toward a seamed relation, and when the forming tool 72 has completed its downward stroke, the parts of the assembly are related in substantially the way illustrated in Fig. 9 of the drawings. The partially formed assembly is allowed to remain in the anvil 71 and a final forming tool 75, Fig. 10, is brought downwardly so as to fully compress the corrugation 64 to the form shown in Fig. 10 of the drawings, and this firmly locks the upper flange 31 of the rubber valve member 30 in respect to the cap 28 and the sleeve 29. In this forming operation, it will be observed that the metal of the corrugation 65 is drawn in a radially outward direction so that the corrugation 65 becomes relatively small as indicated at 65S in Fig. 10, and the corrugation 66 substantially disappears except for the downward flange at its inner side which defines the central opening 70. The portion of the cap 28 that is originally formed so as to afford the corrugations 63, 64 and 65 may be termed a connecting area in that it is utilized in connecting the upper end of the valve member 30 to the cap 28.

When the upper end of the rubber valve member 30 has thus been anchored, the lower end of the valve member is engaged with one or more sharp tools, and is withdrawn in a downward direction until the annular groove 35 is brought into engagement with the flange 53 as shown in Fig. 11 of the drawings, and this imparts a normal longitudinal tension to the valve member 30 which tends to draw the central portions of the lower portion of the valve upwardly about what might be termed a pivot that is afforded by the flange 53 and the annual slot 35. This serves to augment the natural tendency of the rubber valve member 30 to close the slits 44, and hence the valve member tends to return to its normal position as soon as downward opening pressure is relieved.

Such downward or opening pressure is applied to the valve member by inserting the discharge spout S downwardly through the central opening

70 of the cap 28, and when this is done, the lower annular edge 24E of the spout S enters the annular groove or seat 40 and the valve opening pressure is applied directly to the bottom of the seat 40.

When the spout S is inserted into the opening 70 in the cap 28, downward or inward pressure applied to the operating head OH causes the lower edge 24E of the spout to be firmly seated in the annular groove or seat 40 so that the passage 41 is in what might be termed a tightly sealed relationship in respect to the discharge passage 24B. Hence, when the inward or downward pressure is continued on the operating head OH, the valve is distorted from its relationship of Fig. 2 to the relationship of Fig. 3 so as to be thereby opened, and the liquid food under pressure within the container 22 thus moves through the open slits 44 and into the passage 41 so that such food is discharged from the passage 24B of the discharge spout DS. When the food within the container is in the form of cream, the discharge under pressure causes this cream to assume the form of whipped cream as it leaves the discharge spout. When the desired amount of the food or other liquid has been discharged as indicated in Fig. 3 of the drawings, the pressure on the operating head OH may be removed, and when this is done, the normal resiliency of the rubber body or valve 30, taken with the normal tension that has been applied in a longitudinal direction thereto, causes the valve member to assume its closed position. The pressure within the container serves, of course, to maintain this closed relationship.

The user may then withdraw the operating spout S if this is desired, and this spout may be cleaned by conventional methods. It should be observed that when the spout S is in use, the relationship to the valve member is such that the food comes into contact only with the bore 41 and the bore 24B of the spout. Hence, upon removal of the spout S, practically all of the internal walls of the valve member 30 are clean, since the food has not had an opportunity to contact any of these walls except the walls of the bore 41. Hence, the valve structure of the present invention is highly desirable from the standpoint of sanitation.

It will also be evident that the valve structure of the present invention is of such a character that it will not be inadvertently operated so as to discharge food when such discharge is not desired. Moreover, it will be evident that the valve structure of the present invention is extremely simple in character and is adapted for rapid and economical production and assembly by machines and methods that are commercially available and highly efficient. Thus, the present invention materially simplifies and improves the provision of food dispensing valve structures, and the cost of the valve structure of the present invention is such that it may be used on containers that are adapted to be thrown away after a single use.

It will also be evident that for filling purposes, or for imparting a gaseous charge to the container, the valve may be readily opened by simple downward pressure of a filling member shaped generally like the discharge member S. Such filling structure may be quickly and easily put in place and removed, and hence the use of the containers is facilitated.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims:

I claim:

1. In a valve for use as an element of a dispensing container wherein liquid substance is packed under gaseous pressure, said valve structure comprising an upper attaching portion having an outer border area whereby such attaching portion may be secured in position on such a container, a downwardly extending sleeve secured to said attaching portion inwardly of said border area, said attaching portion having a central opening formed therein whereby access may be had to the interior of said sleeve, a rubber valve member of generally sleeve-like form mounted within said sleeve coaxially thereof and anchored at its upper end to said sleeve and secured at its lower end to said sleeve, said valve member projecting beyond the lower end of said sleeve in the form of a pointed element, a plurality of transverse slits formed in the lower face of said projecting pointed element in planes parallel to the axis of said sleeve, said valve member having a longitudinal bore formed therein opening upwardly within said sleeve and terminating at its lower end in the plane of the upper edges of said slits, and said valve member having an upwardly facing annular groove formed about the upper end of said bore and spaced radially outwardly therefrom to receive a sleeve-like valve operating element for bending the projecting pointed element of said valve member to separate said slits and open said valve.

2. In a valve for use as an element of a dispensing container wherein liquid substance is packed under gaseous pressure, said valve structure comprising an upper attaching portion having an outer border area whereby such attaching portion may be secured in position on such a container, a downwardly extending sleeve secured to said attaching portion inwardly of said border area, said attaching portion having a central opening formed therein whereby access may be had to the interior of said sleeve, a rubber valve member of generally sleeve-like form mounted within said sleeve coaxially thereof and anchored at its upper end to said sleeve and secured at its lower end to said sleeve, said valve member projecting beyond the lower end of said sleeve in the form of a pointed element, a plurality of transverse slits formed in the lower face of said projecting pointed element in planes parallel to the axis of said sleeve, said valve member having a longitudinal bore formed therein opening upwardly within said sleeve and terminating at its lower end in the plane of the upper edges of said slits, and said valve member having an upwardly facing annular groove formed about the upper end of said bore and spaced radially outwardly therefrom to receive a sleeve-like valve operating element for bending the projecting pointed element of said valve member to separate said slits and open said valve, and an elongated valve operating element having a stem extended into said opening and into said sleeve and having an operating head on its outer end, said operating element having a laterally and upwardly projecting spout thereon, and being formed with a longitudinal passage originating at the inner end of said stem in alignment with said bore and terminating at the upper end of said spout.

3. In a valve for use as an element of a dispensing container wherein liquid substance is packed under gaseous pressure, said valve structure comprising a main upper attaching plate having an attaching flange at its outer edge whereby such attaching plate may be secured in position on such a container, a downwardly extending sleeve secured to said attaching plate inwardly of said flange, said attaching plate having a central opening formed therein whereby access may be had to the interior of said sleeve, a sleeve-like rubber valve member mounted within said sleeve coaxially thereof and anchored at its upper and lower ends to said sleeve with the intermediate portions of the valve member under longitudinal tension, said valve member projecting beyond the lower end of said sleeve in the form of a pointed element, a plurality of intersecting transverse slits formed in said projecting pointed element in planes parallel to the axis of said sleeve, said valve member having a longitudinal bore formed therein of a diameter smaller than the internal diameter of the upper portions of the sleeve and opening upwardly within said sleeve and terminating at its lower end in the plane of the upper edges of said slits, and said valve member affording an upwardly facing annular surface about the upper end of said bore for engagement by a sleeve-like valve operating element for bending the lower central portions of said valve member downwardly and outwardly against the tension of said sleeve to separate said slits and open said valve.

4. In a valve for use as an element of a dispensing container wherein liquid substance is packed under gaseous pressure, said valve structure comprising an upper attaching plate having a central aperture therein, a connecting area about said aperture, and an outwardly extending attaching area outside of said connecting area whereby said plate may be secured in position on such a container, a downwardly extending sleeve secured to said connecting area of said plate, a sleeve-like rubber valve member having a relatively large central passage extending downwardly and terminating in a bottom wall, said valve member being mounted within said sleeve coaxially thereof and anchored at its upper end to said sleeve and secured at its lower end to said sleeve, said valve member projecting beyond the lower end of said sleeve in the form of a pointed element, a plurality of transverse slits formed in said projecting portion in planes parallel to the axis of said sleeve, said valve member having a longitudinal bore formed in said bottom wall and opening upwardly within said sleeve and terminating at its lower end in the plane of the upper edges of said slits, and said valve member having an annular groove formed in said bottom wall about the upper end of said bore and outwardly spaced therefrom to receive a sleeve-like valve operating element for bending said bottom wall and the projecting lower portion of said valve member in a downward direction to separate said slits and open said valve.

5. In a valve for use as an element of a dispensing container wherein liquid substance is packed under gaseous pressure, said valve structure comprising an upper attaching plate having a central aperture therein, a connecting area about said aperture, and an extending attaching area outside of said connecting area whereby said plate may be secured in position on such a container, a downwardly extending rigid sleeve secured to said connecting area of said plate, a sleeve-like rubber valve member having a relatively large central passage extending downwardly and terminating in a bottom wall, said valve member being mounted within said sleeve coaxially thereof and anchored at its upper and lower ends to said rigid sleeve with the valve member under longitudinal tension, said valve member projecting beyond the lower end of said sleeve in the form of a pointed element, a plurality of intersecting transverse slits formed in said projecting portion in planes parallel to the axis of said sleeve, said valve member having a longitudinal bore formed in said bottom wall and opening upwardly within said sleeve and terminating at its lower end in the plane of the upper edges of said slits, and said valve member having an annular groove formed in said bottom wall about the upper end of said bore and outwardly spaced therefrom to receive a sleeve-like valve operating element for bending said bottom wall and the projecting lower portion of said valve member to separate said slits and open said valve.

6. In a valve for use as an element of a dispensing container wherein liquid substance is packed under gaseous pressure, said valve structure comprising an upper attaching plate having a central aperture therein, a connecting area about said aperture, and an extending attaching area outside of said connecting area whereby said plate may be secured in position on such a container, a downwardly extending sleeve secured to said connecting area of said plate, a sleeve-like rubber valve member having a relatively large central passage extending downwardly and terminating in a bottom wall, said valve member being mounted within said sleeve coaxially thereof and anchored at its upper and lower ends to said sleeve with the intermediate portions of said valve member under longitudinal tension, said valve member projecting beyond the lower end of said sleeve in the form of a pointed element, a plurality of transverse slits formed in said projecting portion in planes parallel to the axis of said sleeve, said valve member having a longitudinal bore formed in said bottom wall and opening upwardly within said sleeve and terminating at its lower end in the plane of the upper edges of said slits, and said bore being of a diameter substantially less than the diameter of the lowermost portion of said central passage to afford an annular area on said bottom wall about the upper end of said bore and outwardly spaced therefrom for engagement by a sleeve-like valve operating element for bending said bottom wall and the projecting lower portion of said valve member to separate said slits and open said valve.

7. In a valve for use as an element of a dispensing container wherein liquid substance is packed under gaseous pressure, said valve structure comprising an upper attaching plate having a central aperture therein, a connecting area about said aperture, and an extending attaching area outside of said connecting area whereby said plate may be secured in position on such a container, a sleeve-like rubber valve member having a relatively large central passage extending downwardly and terminating in a bottom wall, said valve member being disposed beneath said plate coaxially thereof, means anchoring said valve member at its upper end to said plate in said attaching area, said valve member having a projecting lower end in the form of a pointed element, a plurality of transverse slits formed in said projecting portion in planes parallel to the axis of said sleeve, said valve member having a longitudinal bore formed in said bottom wall and opening upwardly within said sleeve and terminating at its lower end in the plane of the upper edges of said slits, and said valve member having an annular groove formed in said bottom wall about the upper end of said bore and outwardly spaced therefrom to receive a sleeve-like valve operating element for bending said bottom wall and the projecting lower portion of said valve member to separate said slits and open said valve.

8. In a valve for use as an element of a dispensing container wherein liquid substance is to be packed under gaseous pressure for discharge by the action of such gaseous pressure, said valve structure comprising a centrally apertured upper attaching plate having an outer border area for use in securing such attaching plate in position on such a container, a downwardly extending sleeve secured to said attaching plate inwardly of said border area, said attaching plate having a central opening formed therein whereby access may be had to the interior of said sleeve, a rubber valve member of generally sleeve-like form disposed beneath said plate upwardly of said border area and coaxially of said plate and anchored at its upper end to said plate, the lower end of said valve member having a cross wall and a downwardly projecting pointed element below and integral with said wall and coaxially of said sleeve, a plurality of transverse slits formed in the lower face of said projecting pointed element in intersecting planes parallel to the axis of said valve member, said valve member having a longitudinal bore formed in the bottom wall opening upwardly with said sleeve and terminating at its lower end in the plane of the upper edges of said slits, and said valve member having an upwardly facing annular surface formed on said wall about the upper end of said bore and spaced radially outwardly therefrom to receive a sleeve-like valve operating element for bending the center portion of said wall and said projecting pointed element of said valve member to separate said slits and open said valve.

9. In a valve for use as an element of a dispensing container wherein liquid substance is to be packed under gaseous pressure for discharge by the action of such gaseous pressure, said valve structure comprising a centrally apertured upper attaching plate having an outer border area for use in securing such attaching plate in position on such a container, a downwardly extending sleeve secured to said attaching plate inwardly of said border area, said attaching plate having a central opening formed therein whereby access may be had to the interior of said sleeve, a rubber valve member of generally sleeve-like form disposed beneath said plate upwardly of said border area and coaxially of said plate and anchored at its upper end to said plate, the lower end of said valve member having a cross wall and a downwardly projecting pointed element below and integral with said wall and coaxially of said sleeve, a plurality of transverse slits formed in the lower face of said projecting pointed element in intersecting planes parallel to the axis of said valve member, said valve member having a longitudinal bore formed in the bottom wall opening upwardly with said sleeve and terminating at its lower end in the plane of the upper edges of said slits, and said valve member having an upwardly facing annular surface formed on said wall about the upper end of said bore and spaced radially outwardly therefrom to receive a sleeve-like valve operating element for bending the center portion of said wall and said projecting pointed element of said valve member to separate said slits and open said valve, and rigid means on said plate extending downwardly into engagement with said valve member about and adjacent the outer edge of said bottom wall.

10. In a valve for use as an element of a dispensing container wherein liquid substance is to be packed under gaseous pressure for discharge by the action of such gaseous pressure, said valve structure comprising a centrally apertured upper attaching plate having an outer border area for use in securing such attaching plate in position on such a container, a downwardly extending sleeve secured to said attaching plate inwardly of said border area, said attaching plate having a central opening formed therein whereby access may be had to the interior of said sleeve, a rubber valve member of generally sleeve-like form disposed beneath said plate upwardly of said border area and coaxially of said plate and anchored at its upper end to said plate, the lower end of said valve member having a cross wall and a downwardly projecting pointed element below and integral with said wall and coaxially of said sleeve, a plurality of transverse slits formed in the lower face of said projecting pointed element in intersecting planes parallel to the axis of said valve member, said valve member having a longitudinal bore formed in the bottom wall opening upwardly with said sleeve and terminating at its lower end in the plane of the upper edges of said slits, and said valve member having an upwardly facing annular surface formed on said wall about the upper end of said bore and spaced radially outwardly therefrom to receive a sleeve-like valve operating element for bending the center portion of said wall and said projecting pointed element of said valve member to separate said slits and open said valve, and rigid means on said plate extending downwardly into engagement with said valve member about and adjacent the outer edge of said bottom wall, said rigid means cooperating with said plate to maintain said valve member under longitudinal tension.

11. In a manually operable check valve for use as an element of a dispensing container wherein liquid substance is to be packed under gaseous pressure for discharge by such gaseous pressure when the check valve is opened, said valve structure comprising a centrally apertured main upper attaching plate having an attaching portion at its outer edge whereby such attaching plate may be secured in position on such a container, a sleeve-like rubber valve member having an outwardly projecting upper flange at its upper end, an outwardly projecting flange at its lower end, a transverse bottom wall adjacent said lower flange with a projecting pointed end below said wall and coaxially related to said valve member, said lower flange having an annular outwardly facing groove therein, said bottom wall having an upwardly opening bore formed therein and terminating in a lower end disposed a substantial distance upwardly of said pointed end, a rigid sleeve surrounding said valve member and anchored at its upper end to said plate and said upper flange, said sleeve having an inturned lower flange engaging said annular groove of the lower flange of said valve member, the pointed lower end of said valve member projecting beyond the lower end of said sleeve, a plurality of intersecting transverse slits formed in said projecting pointed end in planes parallel to the axis of said sleeve, said valve member affording an upwardly facing annular surface about the upper end of said bore for engagement by a sleeve-like valve operating element for bending the central part of the lower portion of said valve member to separate said slits and open said valve.

12. In a manually operable check valve for use as an element of a dispensing container wherein liquid substance is to be packed under gaseous pressure for discharge of the liquid substance by action of the gaseous pressure when the check valve is opened, said valve structure comprising a centrally apertured upper attaching plate having an outer border area whereby such attaching plate may be secured in position on such a container, a valve member formed from a resilient rubber-like material and affording a wall with bordering edge and an upwardly opening bore located centrally of said bordering edge and extended downwardly in said wall, and also having a pointed lower end integral with said wall and having its point disposed directly beneath said bore, said pointed lower end having a plurality of intersecting transverse slits formed therein in planes parallel to and intersecting the axis of said bore and terminating in the plane of the lower end of said bore, rigid means on said plate engaging the bordering edge of said wall to support said wall, means affording a gas and liquid tight seal between said plate and said wall outwardly of said bore, said wall affording an upwardly facing surface about the upper end of said bore to be engaged by a sleeve-like operating element for bending the central portion of said wall downwardly to separate said slits and open said valve.

LESLIE G. BOWEN.

No references cited.